United States Patent Office 3,465,565
Patented Sept. 9, 1969

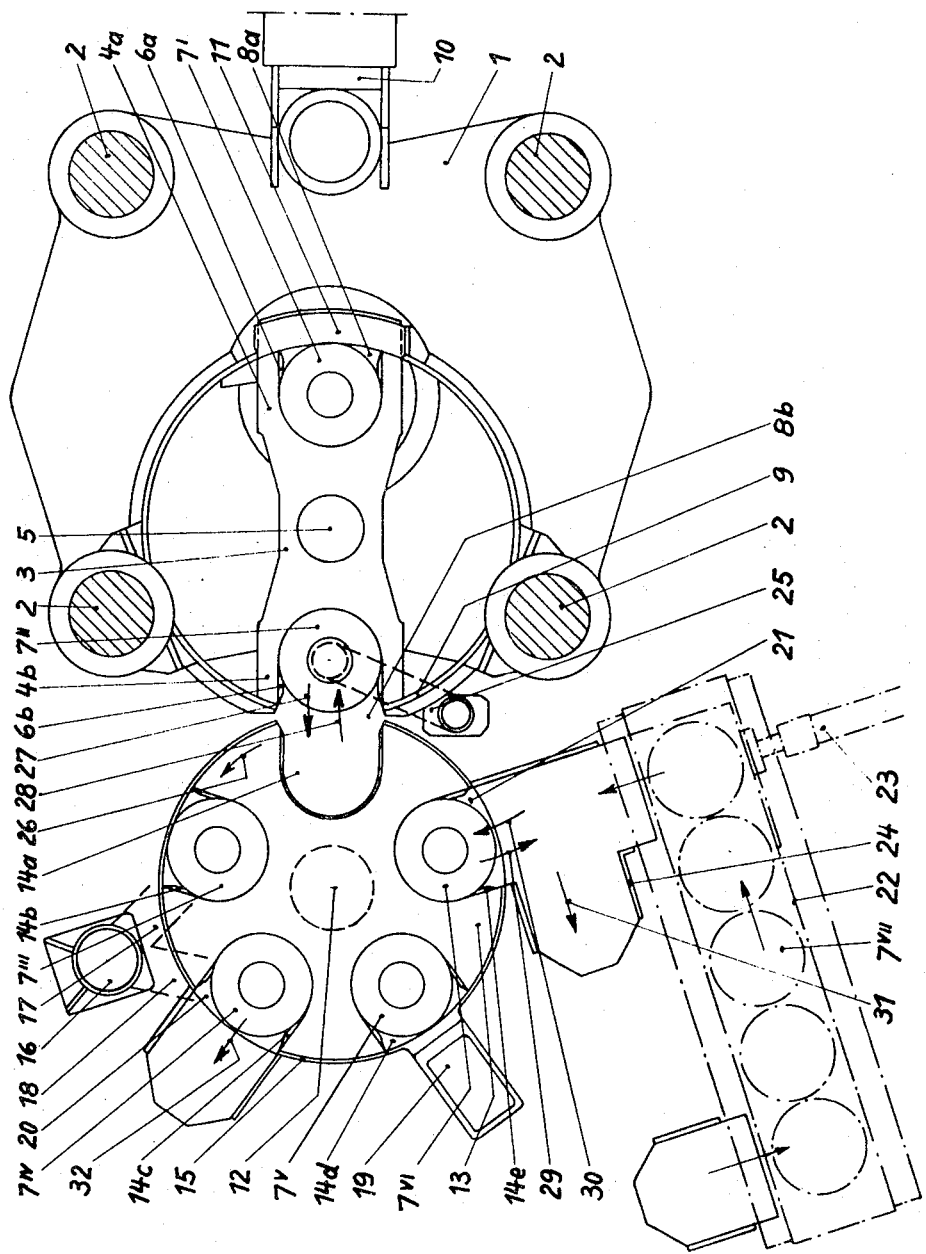

3,465,565
DEVICES FOR PREPARING DIES AND CONVEYING THEM TO THE DIE CARRIER IN EXTRUSION PRESSES
Horst Hans Groos, Metzkausen, Germany, assignor to Schloemann Aktiengesellschaft, Dusseldorf, Germany, a German company
Filed Aug. 8, 1966, Ser. No. 571,104
Claims priority, application Germany, Aug. 17, 1965, Sch 37,564
Int. Cl. B21c 23/00
U.S. Cl. 72—263                                5 Claims

ABSTRACT OF THE DISCLOSURE

In combination with an extrusion press, such as a tube press, means for reconditioning used dies and returning them to the die-carrier of the press, wherein a rotary plate, located beside the die-carrier of the press, is provided with peripheral recesses adapted to receive used dies from recesses in the die-carrier, and to carry them to cleaning, measuring, calibrating and other reconditioning stations arranged around the periphery of the rotary plate before returning them to the die-carrier. The rotary plate is preferably rotatable stepwise, in such a way that its recesses register with each of the said stations successively. Stations may be included for removing damaged dies and replacing them by fresh dies, and for heating the fresh dies.

---

The invention relates to a device for preparing dies and conveying them to the die carrier in extrusion presses.

In extrusion presses of all kinds, it is particularly important that dies be kept in good condition since this affects their life and the quality of the extruded material. It is, therefore, general practice when working under difficult extrusion conditions to exchange the die after each cycle for another die which is prepared in the meantime. Since it takes longer to prepare a die than to complete an extrusion cycle, a number of dies must be provided for each press and these are used successively so as to reduce idle periods during extrusion. In order to have as few dies as possible in circulation, some conventional devices receive the dies directly from the die carrier and prepare them while conveying to the press another die which has been prepared in the meantime. In order to ensure that the extrusion cycle is not detrimentally affected by the removal and supply of dies, exchange is effected during the ejection of the extrusion, the die carrier being a two-armed capstan with appropriate recesses for the dies. One of these rotary arms is always in extruding position while the other is positioned either to return or receive a die. Once the ejection process is completed, the capstan is rotated through 180° so that the die which has been prepared in the meantime is brought into working position while the die which has just been used in the ejection process is pivoted in to exchange position.

A conventional device for preparing the dies and conveying them to the die carrier essentially comprises two guideways located at a distance one above the other beside the die carrier, the said guideways terminating laterally in plates provided with recesses. The guideways are positioned at an angle so that the dies on the lower guideway roll away from the carrier under their own weight while those on the upper guideway roll towards the die carrier. A lifting device is located at the end of the guideways and conveys the dies back from the lower to the upper guideway so that they may either be returned to the die carrier for re-use or, when the dies are not suitable for re-use, be exchanged for a new die. While the dies are on the lower guide way they are prepared for re-use in the press. This preparation comprises cleaning, re-working and cooling or pre-heating.

In order to enable dies to be prepared as rapidly as possible, suitable additional devices must be provided adjacent the recesses in the side cover plates for the guideways. These additional devices essentially comprise a brush with blower arrangement for cleaning the die, and a measuring device for checking the dimensions of the die, followed by an adjustment press. Finally, pre-heating or cooling means are required. In conventional plants these additional devices can only be obtained by considerably increasing the area it occupies. Since the dies must take up an accurately defined position with respect to these additional devices, further arrangements would be required in order accurately to position the dies with respect to the tools. A further disadvantage of this conventional device lies in the fact that the dies move through the machine in an unregulated manner so that they cannot be returned to the die carrier in any accurately determined position, as is important, for instance, in the case of dies used for extruding sections. Moreover, this conventional arrangement can only be used in horizontal presses since the stepped advance of the dies in the device is dependent upon gravity. Since, too, the guideways on which the dies are received and returned must be practically in alignment adjacent the die carrier, it is necessary to make at least part of the upper guideway pivotal adjacent the die carrier so that the die to be received can roll in between the upper and lower guideways.

The invention aims to provide a device for preparing dies and conveying them to the die carrier which is simple in design and which enables the tools used in preparing the die to be arranged just as compactly but accessibly and rationally without the processes involved in preparing the die being detrimental to one another. Finally the dies are to take up accurately defined positions on the path to the individual processing stations and to the tool carrier.

According to the invention, this is achieved by means of a rotary plate located adjacent the die carrier on the press and is provided on its periphery with recesses to receive dies. The use of a rotary plate as a device for preparing the dies and conveying them to the carrier enables the tools used for preparing the dies to be arranged advantageously in a fixed position on the periphery of the rotary plate adjacent the recesses which hold the dies, without their having a mutually detrimental effect and without reducing their accessibility. The rotary plate is preferably able to rotate in a stepped manner dependently of the distance between the recesses. To ensure that damaged dies may be removed from the rotary plate and replaced by new ones without any difficulty, a further embodiment of the invention provides for a stationary device for receiving the dies or returning them to the rotary plate. This additional device is advantageously able to be heated so that the dies which are to be used as replacements may be heated to working temperature before being passed on to the rotary plate.

The invention will now be described with reference to the accompanying drawing which shows an embodiment of the invention but in no restrictive sense.

The sole figure shows a cross-section through the arm bracket of a vertical tube press with a plan view of the device of the invention. 1 is the arm bracket and 2 the columns of the press. 3 is the die carrier which is able to pivot about the shaft 5 and comprises the two opposite arms 4a and 4b. The arms 4a and 4b are provided with recesses 6a and 6b to receive the dies 7', and 7". In order to prevent the dies 7', 7" from falling out of the recesses 6a or 6b during rotation of the carrier 3, the rotary arms 4a and 4b move within a ring 9 provided with holes 8a, 8b. The die holder 11 is located in the recess 8a in the ring 9. The discard separator 10, which cuts the discard from the extruded tube, is conveyed over the die holder 11 in the direction of the axis of the press. Immediately adjacent the pivotal area of the tool carrier 3 is arranged a plate 13 which is able to rotate about the shaft 12. This rotary plate 13 has in the embodiment shown five recesses 14a to 14e which receive the circulating dies $7'$ to $7^{IV}$. In order to prevent the dies from falling out of their recesses during rotation of the plate, the rotary plate 13 also moves within a fixed die holder ring 15. A brush and blower arrangement 17 and a measuring device 18 for the dies is secured to the fixed frame 16. These devices are not shown in greater detail; nor is the adjustment press 19 which serves to widen the free cross-section of the die. The die holder ring 15 contains recesses 20 and 21, by means of which damaged dies may be removed from circulation and replaced by new ones. The recess 21 also co-operates with a die re-heating furnace 22 which is provided with a lifting device 23 to feed the rotary plate 13 with new dies. A removal aperture 24 is provided, through which any damaged dies may be removed from the rotary plate 13. The dies located in the die re-heating furnace are shown at $7^{VII}$.

The mode of operation of the device for preparing the dies and conveying them to the die carrier is as follows:

In the position of the die carrier 3 and rotary plate 13 shown in the drawing, an empty recess 14a in the rotary plate 13 is located opposite the recess 6b in the rotary arm 4b of the die carrier 3. The die $7^{II}$, which is located in the recess 4b and is to be replaced, is pushed by means of a pivoting device 25 into the recess 14a in the rotary plate 13. The rotary plate 13 is then rotated slightly further so that the die $7^{VI}$ which is located in the recess 14e and has in the meantime been prepared for use, reaches the original position of recess 14a in the rotary plate 13. The pivoting device 25 now causes the die $7^{VI}$ to be pushed into the empty recess 6b in the die carrier 3. Thus dies in the carrier 3 are replaced while the block is being ejected. The operating cycle is thus not affected by the exchange of dies. The empty recess 14e in the rotary plate 13 which is now located opposite the recess 6b in the die carrier 3 remains in this position until, after the extrusion process has been completed, the die $7'$ is pushed into this empty recess by means of the pivoting device 25 once the die carrier has revolved through 180°. The rotary plate is again rotated for one step so that a prepared die is again pushed into the recess 6a in the die carrier which has meanwhile become empty. Thus for each extrusion cycle, the rotary plate 13 only needs to be revolved the distance between two recesses. Therefore, only one operation involved in preparing the dies needs to be effected on each die during each extrusion cycle. In the position of the rotary plate 13 illustrated in the drawing, die $7^{III}$ is being cleaned, while die $7^{IV}$ is being checked for tolerance precision and will, if necessary, be removed from circulation through the recess 20. The die $7^V$ will be widened if necessary by means of the adjustment press 19, while the die $7^{VI}$ will either be replaced by a pre-heated die $7^{VII}$ or left in position until it is brought into the position of the recess 14a and is pushed, by means of the pivoting device 25 into the free recess 6a or 6b in the die carrier so as to be ready for the next extrusion cycle. The arrow 26 indicates the direction of rotation of the plate 13, arrows 27 and 28 indicate the exchange of dies between the rotary plate and the die carrier 3, the arrows 29 and 30 indicate the exchange between the rotary plate and the re-heating furnace 22, and finally the arrows 31 and 32 indicate the ejection of damaged dies which are not suitable for re-use.

I claim:

1. In combination with an extrusion press, such as a tube press, means for reconditioning used dies, comprising: a rotary plate formed with peripheral recesses, each adapted to accommodate a die, a number of cleaning, measuring, calibrating and other reconditioning stations arranged arount the rotary plate, a rotatable die-carrier arranged between the press and the rotary plate, the die-carrier being formed with recesses each adapted, in one position of the die-carier, to receive a used die from the press and in another position of the die-carrier to transfer the used die to the rotary plate, and to receive from the rotary plate a reconditioned die to be returned to the press.

2. Means for reconditioning used dies as claimed in claim 1, further comprising means for rotating the rotary plate stepwise, so as to cause its peripheral recesses successively to register with the recesses of the die-carrier.

3. Means for reconditioning used dies as claimed in claim 2, the reconditioning stations being so arranged that at each stoppage of the rotary plate each of its peripheral recesses is located close to one of the said stations.

4. Means for reconditioning used dies as claimed in claim 1, the stations surrounding the rotary plate including at least one station for removing damaged dies from circulation and replacing them by fresh dies.

5. Means for reconditioning used dies as claimed in claim 4, wherein a station for replacing damaged dies by fresh ones includes means, such as a furnace, for reheating fresh dies.

References Cited

UNITED STATES PATENTS

| 2,896,782 | 7/1959 | Billen | 72—263 |
| 3,124,250 | 3/1964 | Krause | 72—263 |
| 3,127,013 | 3/1964 | Dohrn | 72—263 |

FOREIGN PATENTS

| 1,152,084 | 8/1963 | Germany. |

CHARLES W. LANHAM, Primary Examiner

LOWELL A. LARSON, Assistant Examiner